United States Patent
Meier et al.

(10) Patent No.: US 9,566,771 B2
(45) Date of Patent: Feb. 14, 2017

(54) CREDENTIAL SUBSTRATE LAMINATOR HAVING A CARTRIDGE POSITION ADJUSTMENT MECHANISM

(75) Inventors: James Meier, St. Paul, MN (US); Greg Gindele, Maple Lake, MN (US); Anthony Lokken, Shakopee, MN (US)

(73) Assignee: Assa Abloy AB, Stockholm (SE)

(*) Notice: Subject to any disclaimer, the term of this patent is extended or adjusted under 35 U.S.C. 154(b) by 2540 days.

(21) Appl. No.: 12/055,913

(22) Filed: Mar. 26, 2008

(65) Prior Publication Data
US 2008/0236761 A1   Oct. 2, 2008

Related U.S. Application Data

(60) Provisional application No. 60/920,279, filed on Mar. 27, 2007.

(51) Int. Cl.
- *B32B 37/00* (2006.01)
- *B32B 37/22* (2006.01)
- *B32B 38/00* (2006.01)

(52) U.S. Cl.
CPC ......... *B32B 37/0046* (2013.01); *B32B 37/226* (2013.01); *B32B 37/025* (2013.01); *B32B 38/0004* (2013.01); *B32B 2309/70* (2013.01); *B32B 2367/00* (2013.01); *B32B 2425/00* (2013.01); *Y10T 156/17* (2015.01)

(58) Field of Classification Search
CPC ........................... B32B 37/0046; B32B 37/226
USPC .................... 156/230, 238, 249, 272.2, 277, 289,156/308.2, 324, 351, 361, 365, 378, 555, 580,156/582, 583.1, 538, 539, 540, 541, 542, 549; 100/327, 334, 155 R, 160, 176
See application file for complete search history.

(56) References Cited

U.S. PATENT DOCUMENTS

| | | | |
|---|---|---|---|
| 3,434,902 A | 3/1969 | Bliss | 156/230 |
| 4,287,285 A | 9/1981 | Mosehauer | 430/124 |
| 4,300,974 A | 11/1981 | Bauer | 156/360 |
| 4,339,210 A * | 7/1982 | Craft et al. | 400/208 |
| 4,617,080 A | 10/1986 | Kobayashi et al. | 156/359 |
| 4,687,526 A | 8/1987 | Wilfert | 156/64 |
| 5,022,771 A | 6/1991 | Paque | 400/120 |
| 5,060,981 A | 10/1991 | Fossum et al. | 283/109 |
| 5,139,600 A * | 8/1992 | Singer | 156/301 |
| 5,172,938 A | 12/1992 | Schmidt | 283/109 |
| 5,238,524 A | 8/1993 | Seki | 56/538 |
| 5,277,501 A | 1/1994 | Tanaka et al. | 400/120 |
| 5,302,036 A | 4/1994 | Akiyama et al. | 400/229 |
| 5,361,476 A * | 11/1994 | Leopold | 156/109 |

(Continued)

FOREIGN PATENT DOCUMENTS

JP          01-247146    * 10/1989    ............ B29C 67/14

OTHER PUBLICATIONS

U.S. Appl. No. 11/728,589, filed Mar. 26, 2007, Meier et al.

*Primary Examiner* — Philip Tucker
*Assistant Examiner* — John Blades
(74) *Attorney, Agent, or Firm* — Westman, Champlin & Koehler, P.A.; Brian D. Kaul

(57) ABSTRACT

One embodiment of a substrate laminator comprises a housing that includes a cartridge receiver, a substrate transport, a cartridge and a cartridge position adjustment mechanism. The substrate transport mechanism is configured to feed substrates along the processing path in a lengthwise direction. The cartridge is received in the cartridge receiver and includes a ribbon supply. The cartridge position adjustment mechanism is configured to adjust the position of the cartridge in a widthwise direction relative to the substrate processing path.

18 Claims, 12 Drawing Sheets

(56) References Cited

U.S. PATENT DOCUMENTS

| | | | |
|---|---|---|---|
| 5,437,960 A | 8/1995 | Nagate et al. | 430/256 |
| 5,484,502 A | 1/1996 | Bozanic | 156/235 |
| 5,503,702 A | 4/1996 | Filicicchia et al. | 156/249 |
| 5,533,818 A * | 7/1996 | Bahrabadi | 400/208 |
| 5,614,058 A | 3/1997 | Didelot et al. | 156/542 |
| 5,626,699 A | 5/1997 | Didelot et al. | 156/99 |
| 5,673,076 A | 9/1997 | Nardone et al. | 347/171 |
| 5,714,996 A | 2/1998 | Hodai | 347/217 |
| 5,735,994 A | 4/1998 | Lappe et al. | 156/386 |
| 5,807,461 A | 9/1998 | Hagstrom | 156/361 |
| 6,022,429 A | 2/2000 | Hagstrom | 156/64 |
| 6,244,319 B1 * | 6/2001 | Maynard et al. | 156/354 |
| 6,491,461 B1 * | 12/2002 | Nakajima et al. | 400/693 |
| 6,883,573 B2 | 4/2005 | Sasaki et al. | 156/351 |
| 6,981,536 B2 * | 1/2006 | Lien et al. | 156/378 |
| 2004/0114981 A1 * | 6/2004 | Meier et al. | 400/208 |
| 2004/0163752 A1 * | 8/2004 | Hoffman et al. | 156/64 |
| 2006/0113029 A1 | 6/2006 | Lemens et al. | 156/227 |
| 2006/0175395 A1 | 8/2006 | Paulson et al. | 235/380 |

* cited by examiner

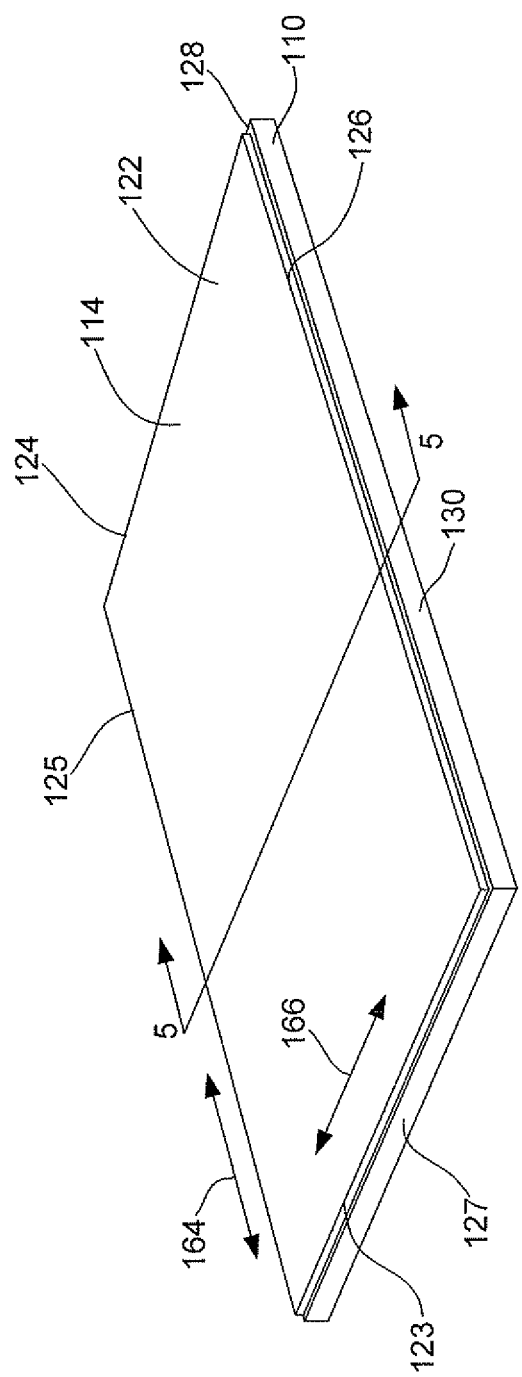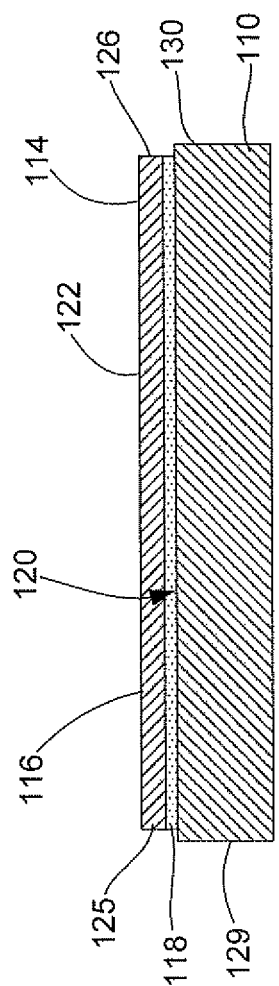
FIG. 4
FIG. 5

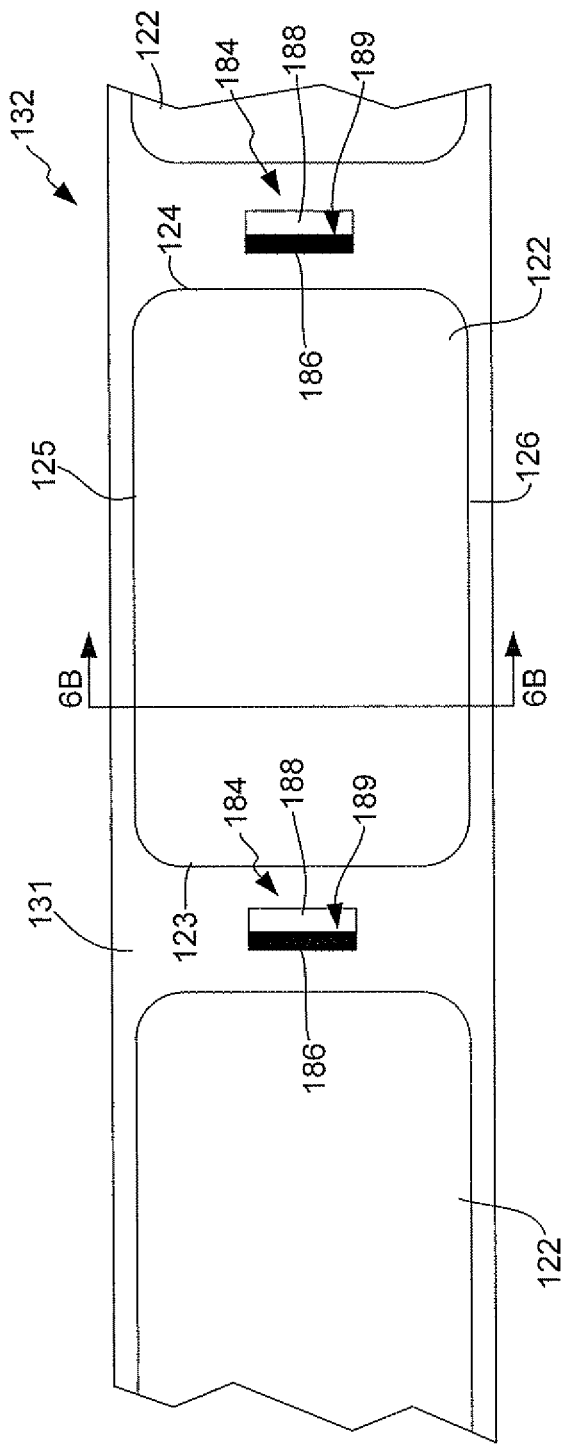
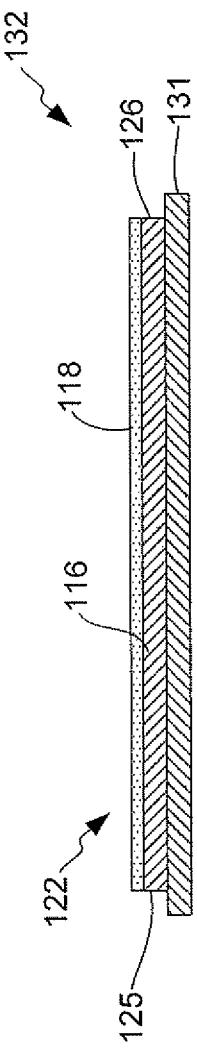

CREDENTIAL SUBSTRATE LAMINATOR HAVING A CARTRIDGE POSITION ADJUSTMENT MECHANISM

FIELD OF THE INVENTION

Embodiments of the present invention are generally directed to credential lamination devices and methods. More particularly, the present invention is directed to credential laminator having a cartridge position adjustment mechanism that provides improved alignment accuracy between an overlaminate patch and the substrate to which it is to be laminated.

BACKGROUND OF THE INVENTION

Credential production devices process credential substrates to form credentials, such as, for example, identification cards, driver's licenses, passports, and other valuable documents. The credential substrates that are used to form such credentials include, for example, paper substrates, plastic substrates, semi-rigid or rigid plastic cards, and other materials. Exemplary processes performed on the credential substrates by credential production devices to produce the credential include printing an image on the substrate, writing data to the substrate, applying an overlaminate material to the substrate and other processes.

Credential laminators are generally configured to apply an overlaminate material to one or more surfaces of credential substrates to protect the surfaces from abrasion and environmental conditions. The lamination operation performed by credential laminators utilizes a laminating roller to apply heat and pressure to the overlaminate material that overlays the surface of the substrate and bonds the overlaminate material to the surface.

One type of overlaminate material is in the form of an overlaminate patch that includes a layer of adhesive on a protective material, such as polyester. The adhesive layer of the patch is used to adhere the patch to a surface of the substrate during the lamination process.

It is desirable to have the overlaminate patch precisely conform to the surface of the credential substrate in order to provide full edge-to-edge protection to the surface. Unfortunately, due to inaccuracies in the laminating process, variances in the overlaminate ribbon and other factors, the overlaminate patch must be made slightly smaller than the surface of the substrate to ensure that the patch can be aligned with the substrate without overhanging the substrate's edges. There is a continuous effort to minimize the size difference between the patch and the substrate in order to get closer to the desired full edge-to-edge surface protection.

SUMMARY OF THE INVENTION

Embodiments of the invention are directed to credential substrate laminator having a ribbon cartridge whose position is adjustable in a widthwise direction relative to the processing path. In one embodiment, the laminator comprises a housing that includes a cartridge receiver, a substrate transport, a cartridge and a cartridge position adjustment mechanism. The substrate transport mechanism is configured to feed substrates along the processing path in a lengthwise direction that is transverse to the widthwise direction. The cartridge is received in the cartridge receiver and includes a ribbon supply. The cartridge position adjustment mechanism is configured to adjust the position of the cartridge in the widthwise direction relative to the substrate processing path.

Other features and benefits that characterize embodiments of the present invention will be apparent upon reading the following detailed description and review of the associated drawings.

BRIEF DESCRIPTION OF THE DRAWINGS

FIG. 4 is a isometric view of an exemplary credential substrate on which an exemplary overlaminate material has been laminated.

FIG. 5 is a cross-sectional view of FIG. 4 taken generally along line 5-5.

FIG. 6A is a top plan view of an overlaminate ribbon in accordance with embodiments of the invention.

FIG. 6B is a cross-sectional view of the overlaminate ribbon of FIG. 6A taken generally along line 6B-6B.

DETAILED DESCRIPTION OF ILLUSTRATIVE EMBODIMENTS

Embodiments of the invention will be described with reference to the drawings. Elements having the same or similar label correspond to the same or similar element.

Credential Substrate Laminator Overview

Figure 1:
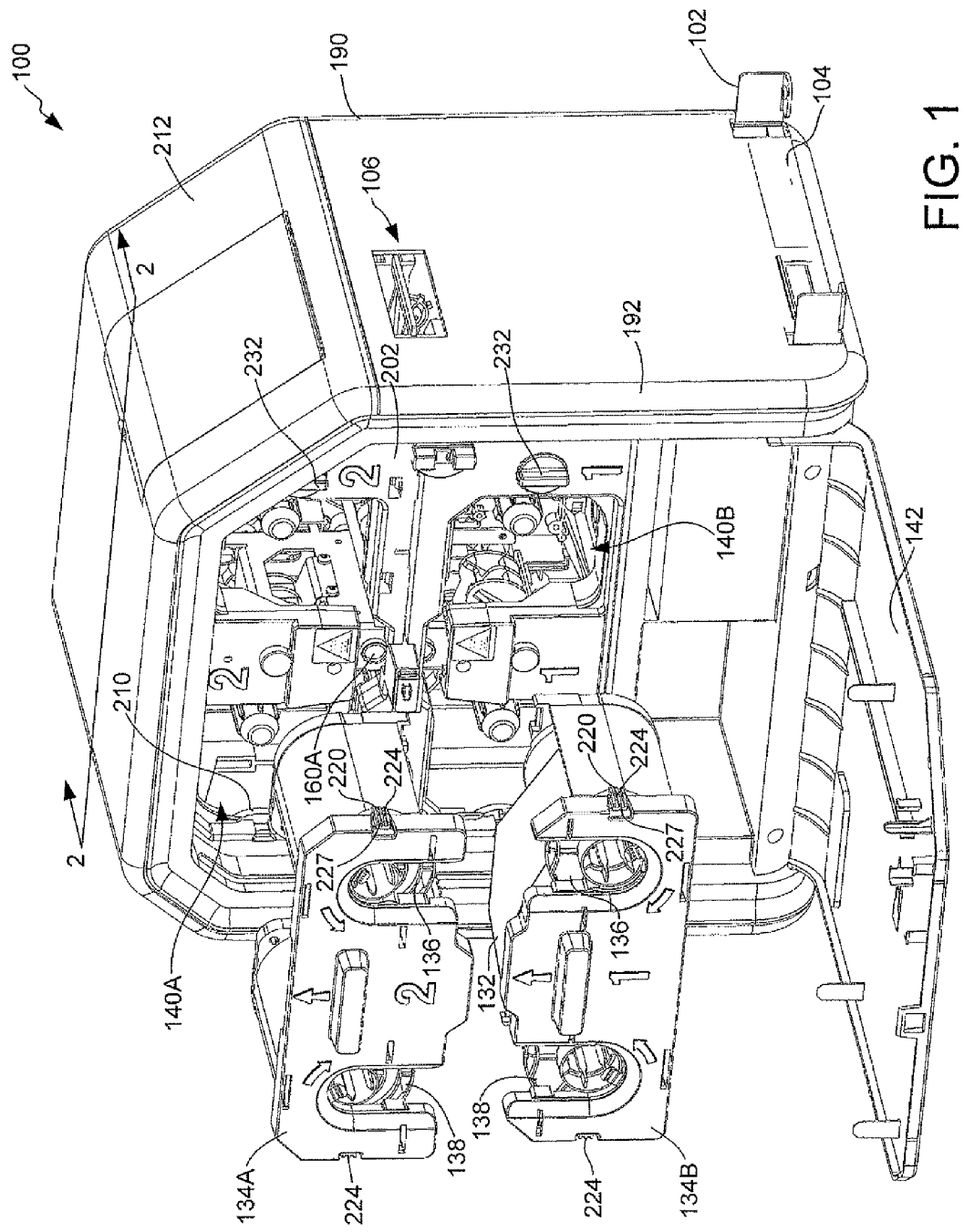
FIG. 1 is a isometric view of a credential laminator with components exploded, in accordance with embodiments of the invention.
Figure 2:
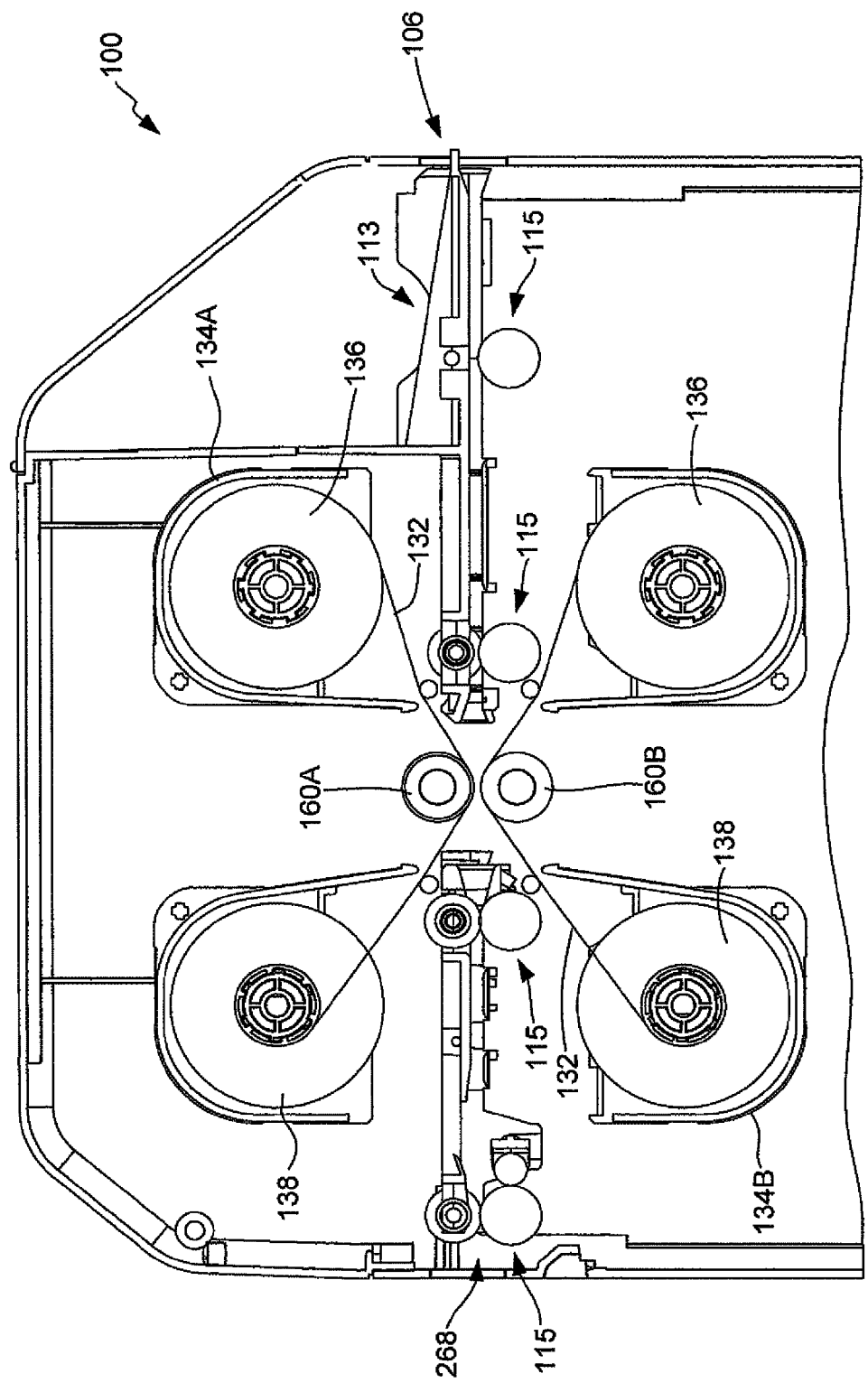
FIG. 2 is a cross-sectional view of the laminator of FIG. 1 taken generally along line 2-2.
Figure 3:
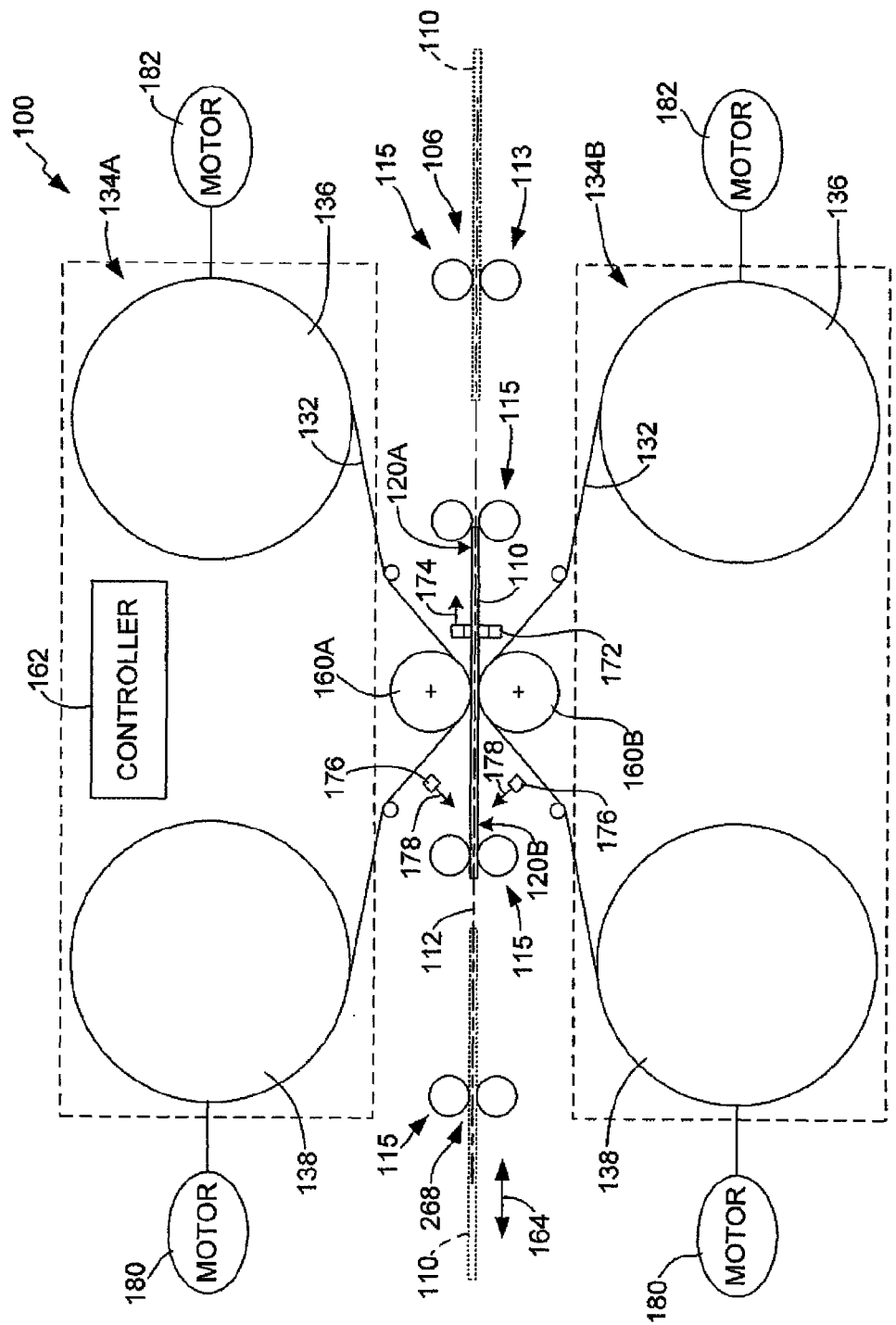
FIG. 3 is a schematic diagram of a credential laminator illustrating various embodiments of the invention.

FIG. 1 is a perspective view of a laminator 100 in accordance with embodiments of the invention with some components exploded, FIG. 2 is a cross-sectional view of the laminator 100 of FIG. 1 taken generally along line 2-2 and FIG. 3 is a schematic diagram of the laminator 100 in accordance with embodiments of the invention. The laminator 100 can be configured as a stand-alone device, as a portion of a larger credential production device that includes printing and/or other credential processing devices (e.g., data encoder), or as a module for attachment to another credential production device, such as using tabs 102 extending from a base 104 of the laminator 100, as shown in FIGS. 1 and 2. Additionally, although the laminator 100 will be depicted as including dual laminating rollers for dual substrate surface lamination, embodiments of the laminator also include only a single laminating roller for single substrate surface lamination operations.

One embodiment of the laminator 100 includes a substrate input 106, at which individual credential substrates 110 are received for processing by the laminator 100. The substrates 110 can be supplied to the input from an attached supply of credential substrates, such as a cartridge or hopper containing the substrates 110. Alternatively, the substrates 110 can be supplied from another credential production device, such as a credential printing device, that is positioned in substrate handoff alignment with the laminator using, or other source of the credential substrates 110. Embodiments of the credential substrate 110 include a rigid or semi-rigid plastic identification card substrate, a paper substrate, or other substrate used to form a credential.

Received substrates 110 are fed along a substrate processing path 112 by a substrate transport mechanism 113, as shown in FIG. 3. One embodiment of the substrate transport mechanism 113 includes motorized pinch roller pairs 115.

In one embodiment, the processing path 112 is substantially flat or at least free of significant bends. This is significant when the substrates 110 are rigid or semi-rigid substrates where bending of the substrates 110 is undesired. Exemplary rigid or semi-rigid substrates 110 include plastic identification card substrates used to form identification cards.

As mentioned above, the laminator 100 is configured to apply an overlaminate material 114 to at least one surface of the credential substrate 110, as illustrated in the perspective view of FIG. 4. FIG. 5 is a cross-sectional view of FIG. 4 taken generally along line 5-5.

The overlaminate material 114 includes a layer of protective material 116, such as clear polyester or other suitable material and a layer of heat activated adhesive 118 that bonds the protective material 116 to the surface 120 of the substrate 110 during a lamination process, as shown in FIG. 5.

The overlaminate material 114 can be provided in several different forms. In one embodiment, the overlaminate material 114 is in the form of individual overlaminate patches 122 that are each slightly smaller than the surface 120 of the substrate 110, such that the leading edge 123, trailing edge 124 and side edges 125 and 126 of the patches 122 do not extend beyond the corresponding leading edge 127, trailing edge 128 and side edges 129 and 130 of the substrate 110, as shown in FIGS. 4 and 5.

In one embodiment, a plurality of the overlaminate patches 122 are attached to a carrier 131 to form an overlaminate ribbon 132, as shown in the top plan view of FIG. 6A. FIG. 6B is a cross-sectional view of the overlaminate ribbon of FIG. 6A taken generally along line 6B-6B. The adhesive layer 118 of each patch 122 is on the side of the protective layer 116 that is opposite the carrier 131. Alternatively, a plurality of the overlaminate patches can be joined end-to-end (not shown) to form the overlaminate ribbon 132. Each of the patches of such a ribbon can be separated along a perforated edge or cut from the remaining patches for attachment to an individual substrate 110.

In order to simplify the discussion of the invention, the overlaminate material 114 that is laminated to the surface 120 of the substrate 110 during a lamination process will be referred to as an overlaminate patch 122, which is supported on the carrier layer 131 of the ribbon 132. However, it is understood that embodiments of the invention include the substitution of the patch laminate 122 and ribbon 132 with the other embodiments of the overlaminate material 114 described above and conventional forms of overlaminate material.

In one embodiment, the laminator 100 includes one or more cartridges 134, such as cartridges 134A and 134B (FIG. 1), each of which include a supply spool 136 and a take-up spool 138, on which the ribbon 132 is wound. The cartridges 134 simplify the loading of the ribbon 132 into the laminator 100.

In one embodiment, the one or more cartridges 134 of the laminator 100 are front-load cartridges. That is, the cartridges 134A and 134B are respectively loaded into cartridge receivers 140, such as cartridge receivers 140A and 140B, that are located on a front side of the housing of the laminator 100, such as behind a cover 142, as shown in FIG. 1.

As mentioned above, embodiments of the laminator 100 include single side and dual side laminating configurations. Accordingly, embodiments of the laminator 100 include a single laminating roller 160 for single sided lamination and dual laminating rollers 160 to accommodate single or dual sided substrate lamination.

In one embodiment, the laminator 100 includes laminating roller 160A positioned above the processing path 112, as shown in FIGS. 2-3. In another embodiment, the laminator 100 includes laminating roller 160B positioned below the processing path 112. For these single sided lamination embodiments, a platen roller or other support can be provided on the side of the processing path 112 that is opposite either laminating roller 160A or laminating roller 160B to support the substrate 110 during a single side lamination operation.

In yet another embodiment, the laminator 100 includes both laminating roller 160A and laminating roller 160B to accommodate dual sided substrate lamination. In accordance with one embodiment, the laminating rollers 160A and 160B are placed immediately above and below each other as illustrated in FIGS. 2 and 3. In this embodiment, the laminating rollers 160A and 160B provide the necessary support to the substrate 110 during single or dual sided lamination operations. That is, the pressure applied to the substrate 110 by laminating roller 160A is balanced by the pressure applied to the substrate 110 by laminating roller 160B during lamination processes. The dual laminating rollers 160 allow the laminator 100 to perform simultaneous lamination of both sides 120A and 120B (FIG. 3) of the credential substrate 110.

Alternatively, the laminating rollers 160 could be offset from each other along the processing path 112. This would require a support, such as a platen roller, for example, to be positioned on the opposing side of the processing path 112 from each laminating roller. Disadvantages to this configuration include the additional components (e.g., platen rollers), the necessity to accommodate for a longer processing path 112 resulting in a larger laminator and the potential for substrate warping problems due to the uneven heating of the substrate 110 during lamination operations.

As mentioned above, the laminator 100 can include one or two ribbon cartridges 134 each containing separate supplies of the overlaminate ribbon 132, based on whether the laminator 100 includes single or dual laminating rollers 160. Ribbon cartridge 134A supplies laminating roller 160A with overlaminate patches for laminating to the surface 120A of the substrate 110 while ribbon cartridge 134B supplies laminating roller 160B with overlaminate patches 122 for laminating to the surface 120B of the substrate 110.

One embodiment of the laminator 100 includes a controller 162, which generally controls the operations of the laminator 100 in accordance with program instructions stored in a tangible medium of the laminator 100 or received from a host application running on a computer, for example. While the controller 162 is represented as a single entity, it is understood that the controller 162 may comprise multiple microcontrollers, microprocessors, memories, etc., and be in the form of single or multiple controller units.

Exemplary laminator operations that are directed by the controller 162 include feeding of the overlaminate patches 122 through the control of corresponding motors, receiving and feeding of substrates 110 along the processing path 112 through the control of the motors of the transport mechanism 113, aligning (lengthwise) one or two of the patches 122 to a substrate 110, laminating one or two of patches 122 to a substrate 110 using the laminating rollers 160, and other laminator operations.

Patch Alignment

It is desirable to maximize the surface area of the substrate 110 that is covered by the patch 122 in order to provide maximum protection to the surface 120 of the substrate 110. However, due to inaccuracies in the laminating process, variances in the overlaminate ribbon and other factors, the patch 122 is made slightly smaller than the surface 120 of the substrate 110 in order to ensure that the patch 122 does not extend beyond the substrate's edges, as shown in FIGS. 4 and 5. Accordingly, precision during the laminating process is extremely important because it ultimately determines the size of the patch that can be laminated to the surface of the substrate and, thus, the area of the surface that can be protected.

Embodiments of the invention operate to improve the accuracy at which the patches 122 can be aligned to the substrate 110 in the lengthwise direction 164, which generally corresponds to the direction in which the substrate 110 is fed along the processing path 112, and the widthwise direction 166, shown in FIG. 4. The substrates 110 have a substantially fixed widthwise position relative to the processing path. The improved accuracy allows the patch 122 to be formed longer and wider than patches 122 used in conventional laminators resulting in improved substrate surface protection.

Lengthwise Alignment

The alignment of the patches 122 to the substrate 110 in the lengthwise direction requires that the leading and trailing edges 123 and 124 of the patches 122 do not overhang the corresponding leading and trailing edges 127 and 128 of the substrate 110, as shown in FIG. 4. One embodiment of the laminator 100 includes a substrate sensor 172, illustrated schematically in FIG. 3, that is configured to detect the leading edge 127 or the trailing edge 128 (FIG. 4) of the substrate 110 as it is fed along the processing path 112, and provide an output signal 174 that is indicative of the detection of the leading or trailing edge of the substrate. The output signal 174 is received by the controller 140 and is used to direct the substrate 110 through control of the transport mechanism 113 to a desired position along the processing path 112, such as a position relative to the laminating roller 160. One exemplary substrate sensor 172 is an optical sensor.

One embodiment of the laminator 100 includes a patch sensor 176, illustrated schematically in FIG. 3, that is configured to either directly or indirectly detect the leading edge 123 or the trailing edge 124 (FIGS. 5 and 6A) of one of the patches 122, and provide an output signal 178 that is indicative of the detection of the leading or trailing edge of the patch 122. While the patch sensor 176 is illustrated as being on the take-up spool 138 side of the laminating roller 160, it could alternatively be positioned on the supply spool 136 side of the laminating roller 160. The output signal 178 is received by the controller 162 and is used by the controller 162 to position the patch 122 in a desired position relative to the substrate 110 by driving one or more motors, such as motor 180 connected to the take-up spool 138 and configured to wind the ribbon 132 onto the take-up spool 138, or a motor 182 connected to the supply spool 136 and configured to wind the ribbon 132 onto the supply spool 136, for example.

One exemplary patch sensor 176 is an optical sensor that is configured to detect a mark 184, shown in FIG. 6A, on the carrier 131 of the ribbon 132. One embodiment of the mark 184 comprises a printed mark 186, such as a black mark on the carrier 131, and a hole 188 in the carrier 131 that cuts a portion of the printed mark 186. The hole 188 is cut during the die cutting of the patches 122 when the overlaminate ribbon 131 is formed. Thus, the edge 189 of the printed mark 186 at the hole 188 is a known distance from the leading edge 123 or the trailing edge 124 of the corresponding patch 122. The edge 159 is detected by the sensor 176 and indicated by the output signal 178 and is used by the controller 162 to position one of the patches 122 in the desired position relative to the substrate 110 using the motors 180 or 182.

In one embodiment, the detection of a mark 184, shown in FIG. 6A on the carrier 131 of the ribbon 132 indicates that the patch 122 is in a desired position for lengthwise alignment with a substrate 110. Alternatively, the detection of the mark 184 on the carrier 131 of the ribbon 132 can be followed by the feeding of the patch 122 a predetermined distance to place it in the desired position.

Widthwise Alignment

Figure 7A:
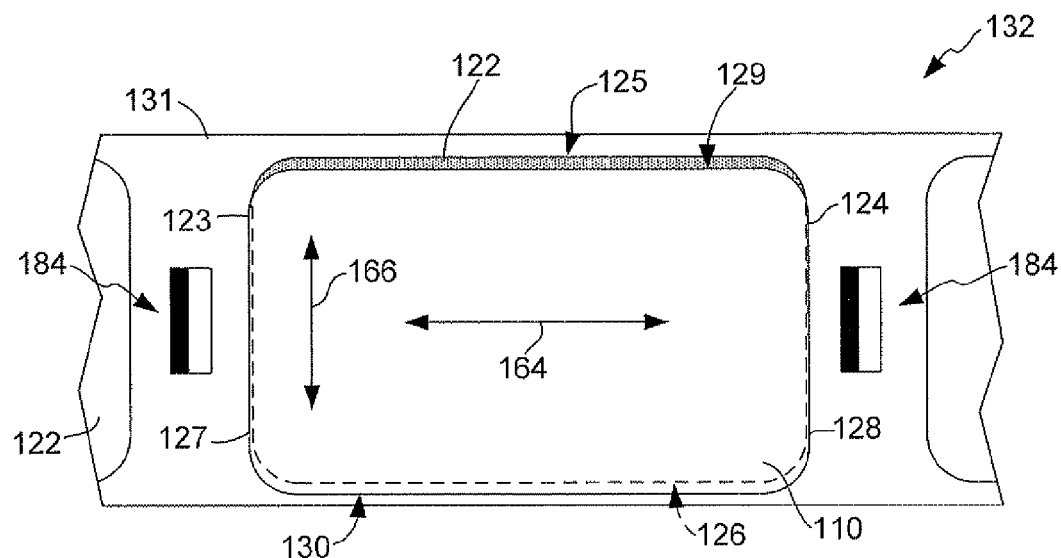
FIGS. 7A-B top plan views of an overlaminate ribbon illustrating misalignment in a widthwise direction between a substrate and an overlaminate patch.
Figure 7B:
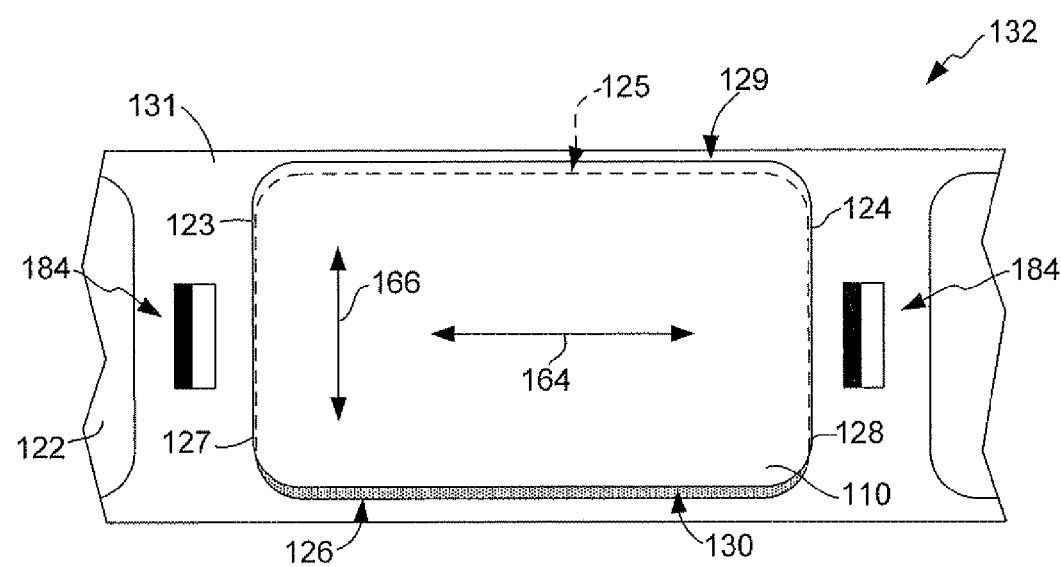

During a lamination operation, the widthwise position of the substrate in the processing path is generally fixed. However, the position of the patches 122 may vary. FIGS. 7A and 7B are top plan views of an overlaminate ribbon 132 and a credential substrate 110 overlying the overlaminate ribbon 18. FIGS. 7A and 7B illustrate a misalignment, in the widthwise axis or direction 166, between the substrate 110 and a patch 122 that is attached to a carrier 131 of the ribbon 132. This widthwise misalignment can be attributable to variance between the positioning of the patches 122 on the carrier 131 in the widthwise direction 166. This variance in the positioning of the patches 122 on the carrier 131 results in misalignment between the side edges 125 and 126 of the patches 122 to the corresponding side edges 129 and 130 of the substrate. FIG. 7A illustrates a misalignment where the patch 122 is located too far toward a rear side 190 (FIG. 1) of the laminator 100 or the processing path 112 relative to the substrate 110 and FIG. 7B illustrates a misalignment where the patch 122 is located too far toward a front side 192 (FIG. 1) of the laminator or the processing path 112 relative to the substrate 110. This misalignment between the patches 122 and the substrate 110 in the widthwise direction 166 when in their aligned positions limits the width of the patches 122 to a size that will accommodate for this variance and ensure that the patch 122 will not extend beyond one of the side edges of the substrate 110 following the lamination operation.

Figure 8:
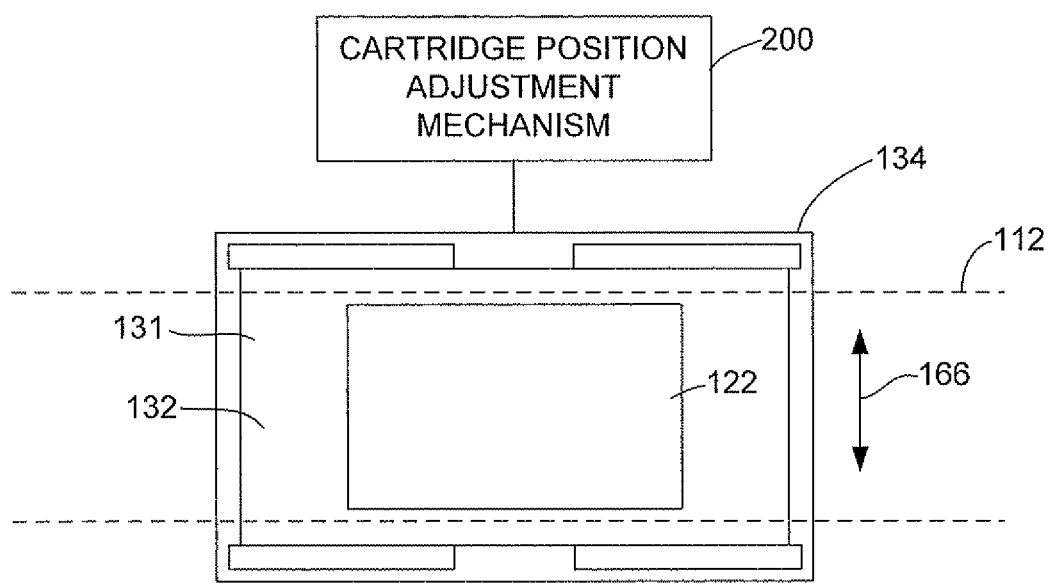
FIG. 8 is a simplified top plan view of a cartridge position adjustment mechanism in accordance with embodiments of the invention.

Embodiments of the invention are directed to improving the widthwise positioning of the patches relative to the substrate in order to reduce this variance and, thus, allow for the lamination of a larger patch 122 to the substrate 110. In accordance with one embodiment, the laminator 100 includes a cartridge position adjustment mechanism 200, which is illustrated in the simplified diagram of FIG. 8, and is configured to adjust the widthwise position of the patch 122 relative to the processing path 112 and, thus, the substrate 110 and the housing 212. In one embodiment, the mechanism 200 operates to adjust the position of the cartridge 134 carrying the ribbon 132 in the widthwise direction 166 relative to the processing path 112. Accordingly, the mechanism 200 allows an operator of the laminator 100 to improve the widthwise alignment between the patch 122 and the substrate 110 and reduce the variance between the widthwise location of the patches 122 on the carrier 131, such as between different ribbons 132. As a result, the size of the patches 122 can be increased in the widthwise direction 166 resulting in greater surface area coverage of the substrate 110.

Figure 9:
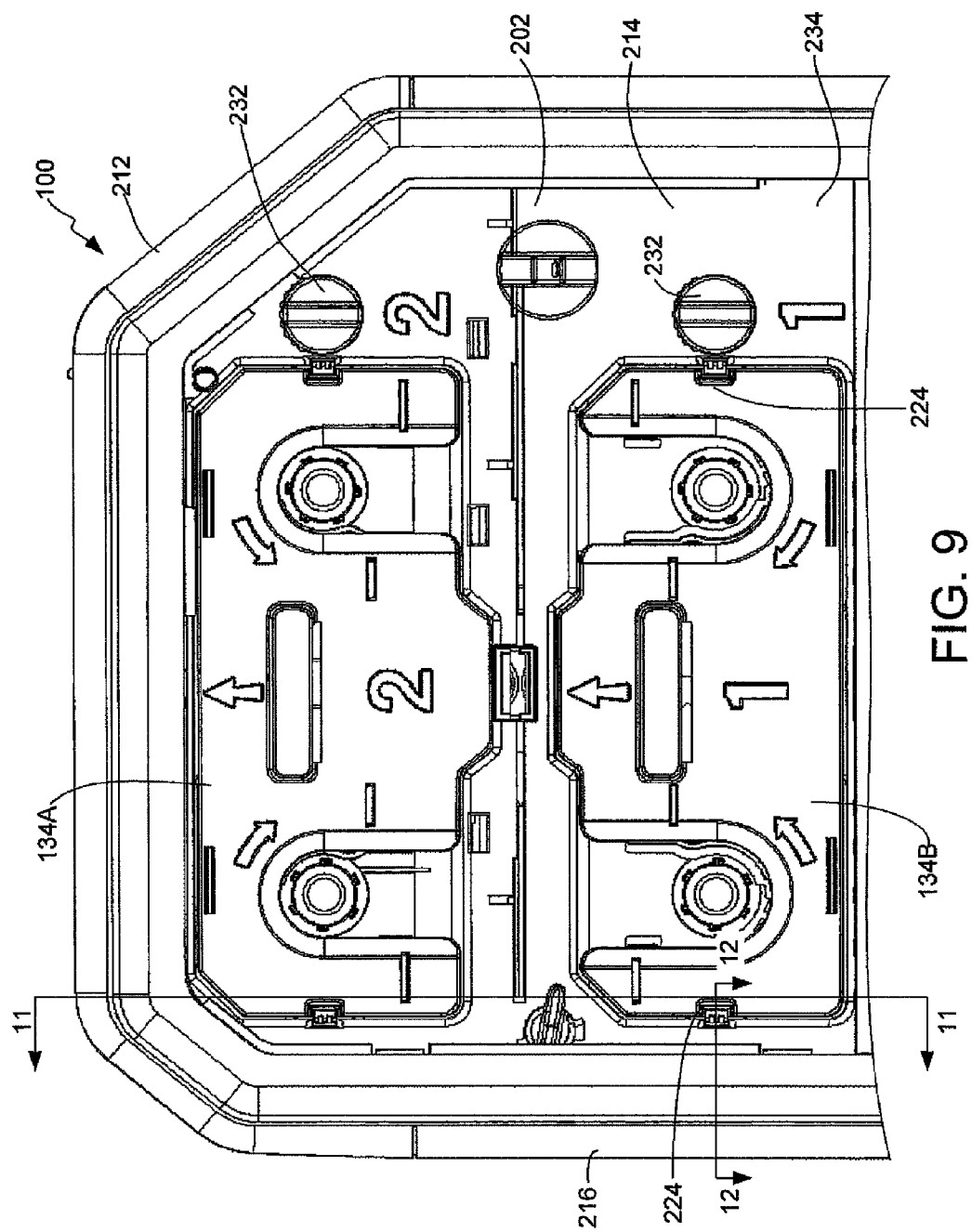
FIG. 9 is a front plan view of a credential substrate laminator in accordance with embodiments of the invention.
Figure 10:
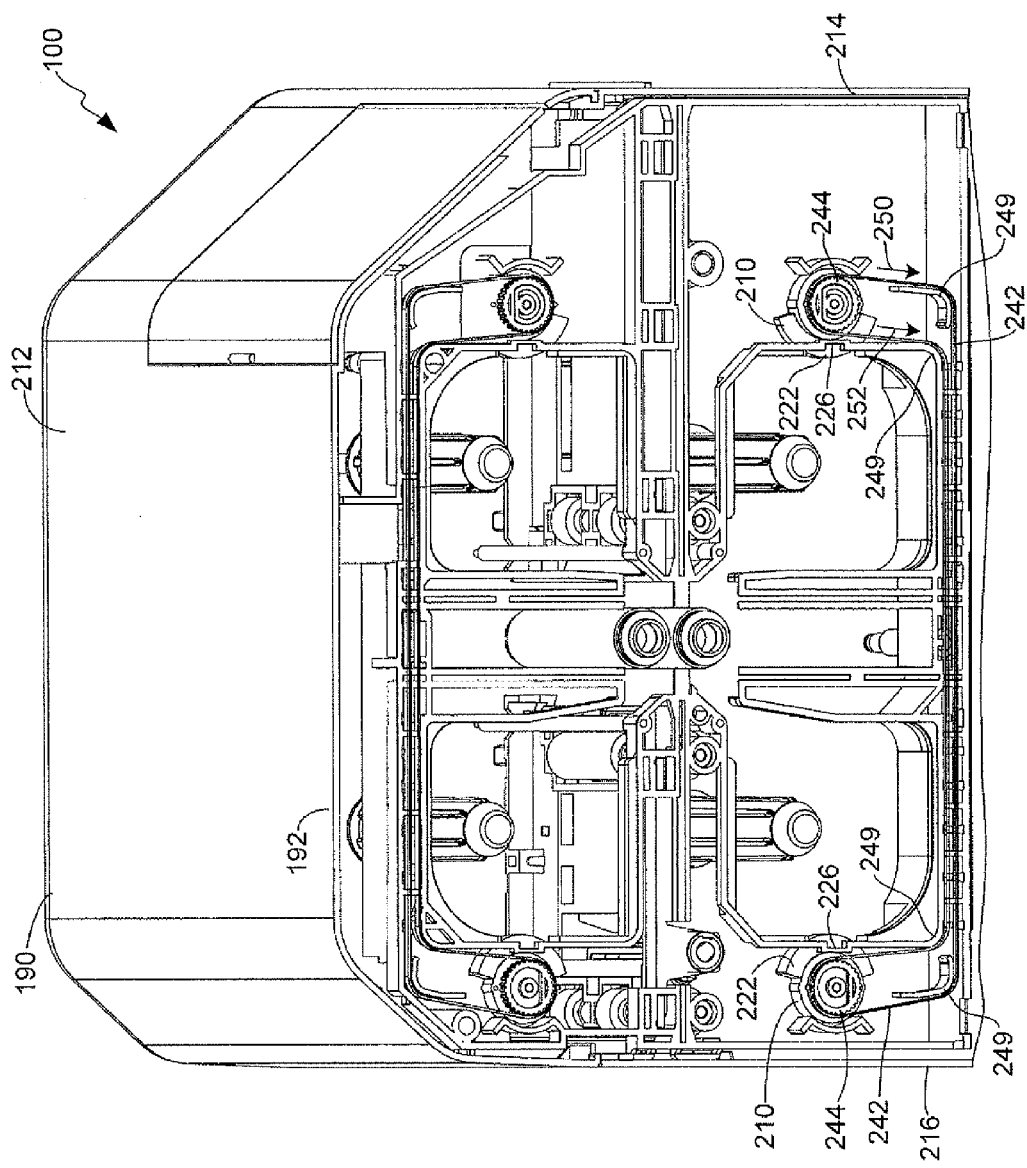
FIG. 10 is a is a front plan view of a credential substrate laminator with a front housing panel removed.
Figure 11:
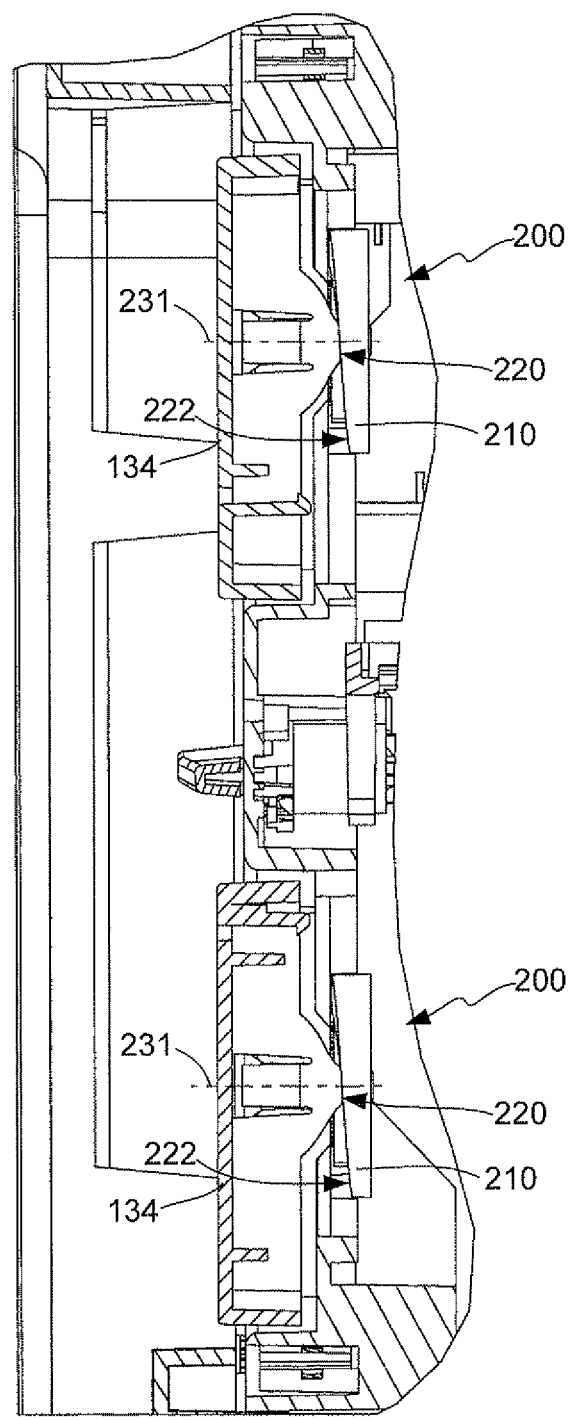
FIG. 11 is a cross-sectional view of a credential substrate laminator taken generally along line 11-11 of FIG. 9.
Figure 12:
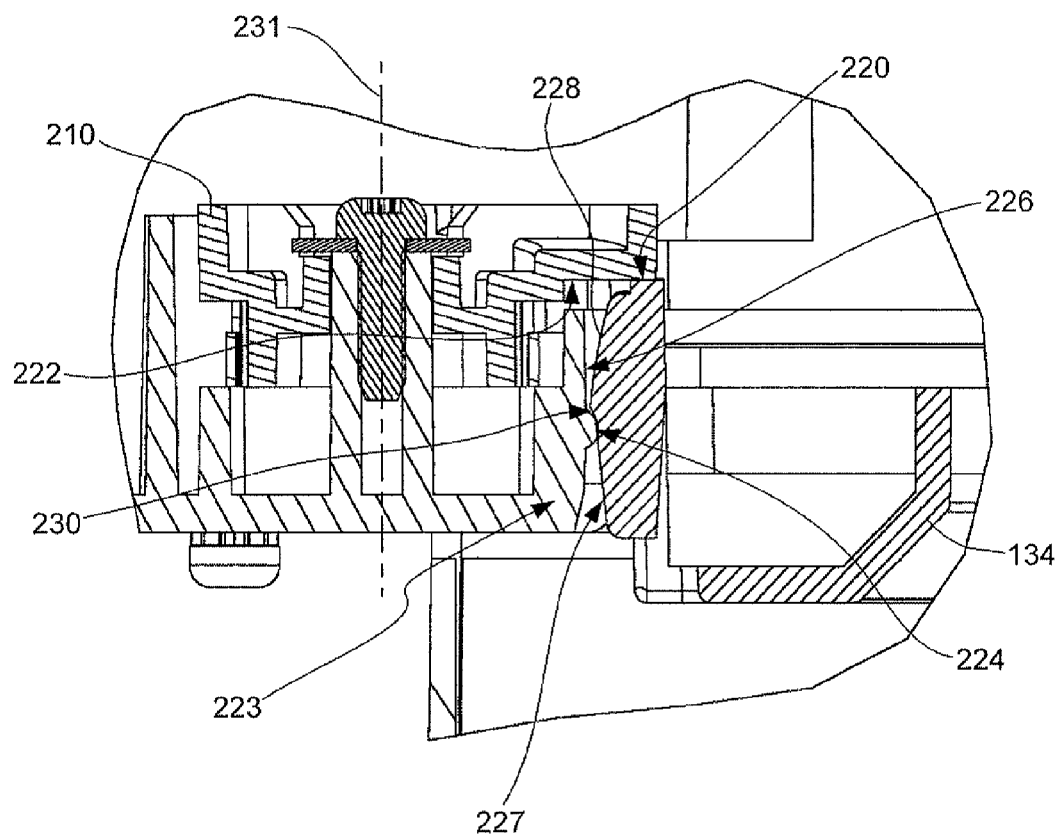
FIG. 12 is a cross-sectional view of a credential substrate laminator taken generally along line 12-12 of FIG. 9.

Embodiments of the cartridge position adjustment mechanism 200 will be described with reference to FIGS. 9-12. FIG. 9 is a front plan view of the laminator 100 with the cover 142 opened and the cartridges 134A and 134B installed in the cartridge receivers 140A and 140B. FIG. 10 is a front plan view of the laminator 100 with the cover 142 opened, the cartridges 134A and 134B removed and a front housing panel 202 (FIG. 9) removed in order to expose components of the mechanism 200. FIG. 11 is a cross-sectional view of the laminator 100 taken generally along line 11-11 of FIG. 9. FIG. 12 is a cross-sectional view of the laminator 100 taken generally along line 12-12 of FIG. 9.

One embodiment of the cartridge position adjustment mechanism 200 comprises a pair of stop cams 210, which are supported by the housing 212 on opposing sides 214 and 216 of the cartridge receiver 140, as shown in FIG. 10. One embodiment of the cartridge 134 comprises a pair of stop surfaces 220 that are each positioned on opposing sides 214 and 216 of the cartridge 134 to engage the corresponding front facing surface 222 of the stop cams 210 when the cartridge 134 is installed or received in the cartridge receiver 140, as illustrated in FIG. 11.

In accordance with one embodiment, a biasing mechanism is employed to bias the stop surfaces 220 against their corresponding stop cams 210 while the cartridge 134 is installed in the receiver 140. Those skilled in the art understand that there are numerous types of biasing mechanisms that may be employed to perform this function, the selection of which may depend on the configuration of the stop cams 210 and the stop surfaces 220 of the cartridges 134.

FIG. 12, which is a cross-sectional view of a credential substrate laminator taken generally along line 12-12 of FIG. 9, illustrates one embodiment of a biasing mechanism 223 that operates to bias or urge the stop surfaces 220 against a front-facing surface 222 of the stop cams 210 (FIG. 11). Thus, in accordance with the exemplary embodiments described above, the biasing mechanism operates to bias the cartridge 134 toward the rear side 190 and into the cartridge receiver 140 when the cartridge 134 is installed in the receiver 140. In one embodiment, the biasing mechanism comprises tabs 224 (FIG. 1) positioned on both sides 214 and 216 of the cartridge 130 that are configured to engage corresponding surfaces 226 (FIG. 10) of the cartridge receiver 140 when the cartridge 130 is installed in the receiver 140. A surface 227 of each tab 224, which may include a beveled portion 228 to facilitate easy insertion of the cartridge 134 into the receiver 140, engages the corresponding surface 226. In one embodiment, the tabs 224 are configured to flex toward the side of the cartridge 134 and apply a spring force to compress the surfaces 226 and 227 together when the cartridge 134 is received in the cartridge receiver 140. The compression of the surfaces 226 and 227 against each other urges the cartridge 134 toward the rear side 190 of the laminator 100 and holds the stop surfaces 220 against the surfaces 222 of the stop cams 210. It is understood by those skilled in the art that the tabs 224 and the surfaces 227 could be respectively relocated to the cartridge receiver and the cartridge without departing from the spirit and scope of the invention.

In one embodiment, the surface 226 and the surface 227 respectively include portions 229 and 230 that cooperate to bias the stop surfaces 220 toward the surface of the cams 210 in response to their compression against each other over a desired range of relative movement there-between that corresponds to the desired range of depth adjustment for the cartridge 130. For example, the portion 229 may be in the form of a protuberance while the surface 230 is shaped, as shown in FIG. 12, such that their engagement with each other produces the desired biasing of the cartridge 134 toward the rear side 190 of the laminator 100 when the cartridge is installed in the receiver 140.

In one embodiment, the front-facing cam surface 222 of the stop cams 210 is tapered relative to a plane extending perpendicular to an axis of rotation 231 of the cam stop 210, and operates to limit the depth at which the cartridge 134 is received within the cartridge receiver 140 along the widthwise direction 166 toward rear side 190 of the laminator 100. Accordingly, the stop cams 210 determine the position of the ribbon 132 relative to the processing path 112 in the direction 166 and, thus, the widthwise position of the patches 122 relative to the substrates 110 that are fed along the processing path 112.

The rotation of the cam stops 210 about their axes 231 changes the location of their tapered surfaces 222 in the widthwise direction 166 where they engage the corresponding stop surfaces 220. This rotation of the stop cams 210 about the axis 300 drives the stop surfaces 220 and, thus, the cartridge 134, along the widthwise direction 166 either toward the rear side 190 or the front side 192 of the laminator 100.

One embodiment of the cartridge position adjustment mechanism 200 comprises an adjuster knob 232 (FIGS. 1 and 9) that is configured to drive the rotation of the stop cams 210 about their axes 231. In accordance with one embodiment, the rotation of the adjuster knob 232 results in a corresponding simultaneous rotation of both stop cams 210 about their axes 231. This feature allows for the identical adjustment of the position of both sides 214 and 216 of the cartridge 134. As a result, it becomes unnecessary to separately adjust stop cams 210 in order to maintain the preferred parallel alignment between the side edges 125 and 126 of the patches 122 to the side edges 129 and 130 of the substrate 110, or to the processing path 112. In one embodiment, the adjuster knob 232 is located on a front side 234 of the laminator 100, as shown in FIG. 9.

In accordance with one embodiment, the cartridge position adjust mechanism 200 comprises a belt 242 that is looped around a gear 244 of each of the stop cams 210. Guide members 249 of the housing 12 maintain the belt 242 in tension. Rotation of one of the cams 210 moves the belt 242, which rotates the gear 244 of the other stop cam 210 resulting in the simultaneous rotation of both cam surfaces 222 about the axis 231. In one embodiment, the adjuster knob 232 is coupled to the gear 244. As a result, rotation of the adjuster knob 232 rotates the gear 244 to drive movement of the belt 242 in either the direction indicated by arrow 250 or arrow 252 in response to clockwise and counterclockwise rotation of the adjuster knob 232. This movement of the belt 242 in response to the rotation of the adjuster knob 232 drives the simultaneous rotation of the stop cams 210 and movement of the cartridge 130 along the widthwise axis 166 either toward the rear side 190 or the front side 192 of the laminator 100.

It is understood by those skilled in the art that the location of the stop cams 210 and the stop surfaces 220 could be reversed such that the stop cams 210 are attached to the cartridge 134 and the stop surfaces are attached to the housing 212, without departing from the spirit and scope of the present invention.

It is further understood by those skilled in the art that the surfaces of the stop cams and the stop surfaces could be oriented in many different configurations while providing the desired cartridge depth adjustment in response to movement of the stop cams relative to the stop surfaces. Thus, embodiments of the invention include the biasing of front-facing stop surfaces against rear-facing surfaces of stop cams when the cartridge is installed in the cartridge receiver. In such an instance, the biasing mechanism would operate to bias the stop surfaces against the surfaces of the stop cams using any suitable means.

Additionally, while the exemplary embodiments of the invention described herein discuss the movement of the cartridges along an axis (i.e., depth direction) in response to forces applied to the cartridge along the same axis through the engagement of the stop surfaces with the stop cams, those skilled in the art understand techniques that can be used to translate forces applied to the cartridges in an off-axis direction (i.e., transverse or oblique to the depth direction) to movement of the cartridge in the on-axis or depth direction. That is, those skilled in the art understand techniques used to translate movements in one direction to movements in another direction. Thus, for instance, it is within the scope of the present invention to configure cartridges with the stop surfaces that engage a side-facing surface of the stop cams and cause the desired cartridge depth adjustment in response to movement of the stop cams relative to the stop surfaces.

Exemplary Lamination Operation

Figure 13A:
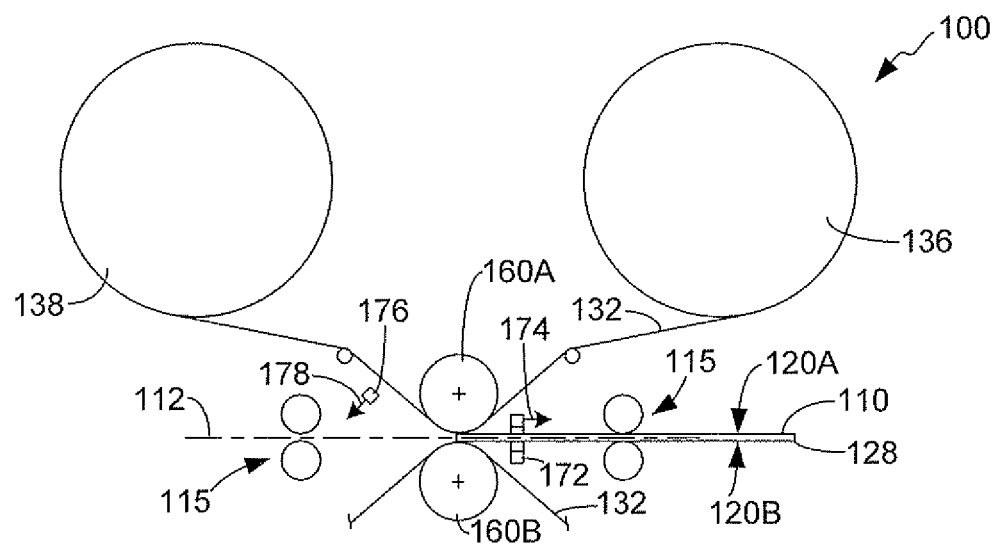
FIGS. 13A-B are schematic diagrams illustrating a dual-sided lamination process in accordance with embodiments of the invention.
Figure 13B:
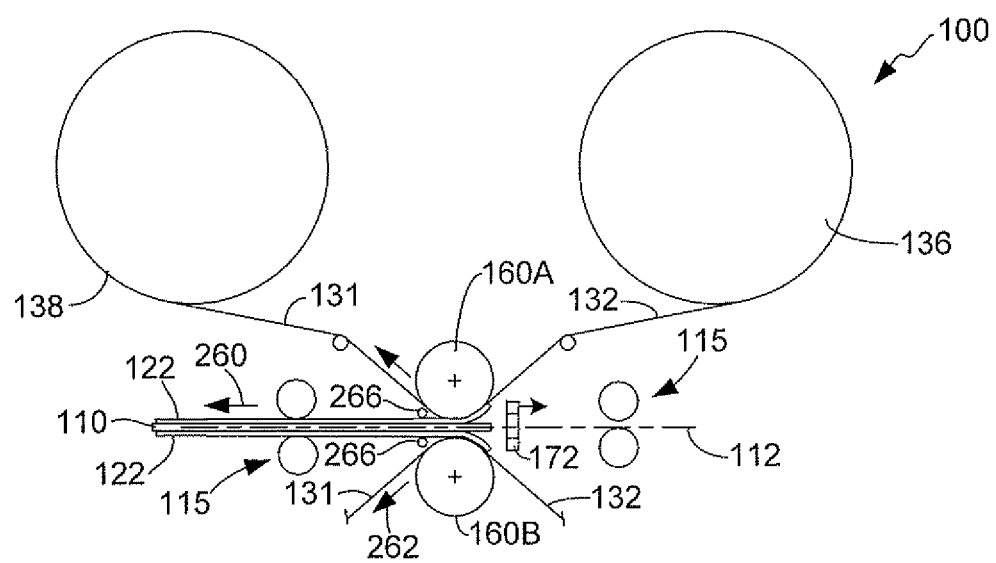

FIGS. 13A and 13B illustrate a general lamination operation of overlaminate patches 122 to front and back surfaces 120A and 120B of the substrate 110 after the widthwise position of the cartridges 134 have been adjusted using the mechanism 200 to align the patches 122 with the substrates 110 or processing path 112, as discussed above. The lamination operation is generally directed by the controller 162 in response to instructions stored in a tangible medium of the laminator 100 or received from a host application running on a computer, for example.

A substrate 110 is received at the substrate input 106 from a source of the substrates 110 and is transported along the processing path 112 toward the laminating rollers 160A and 160B, as shown in FIG. 3. The source of substrates 110 can be, for example, a supply of the credential substrates 110, another credential production device that is positioned in substrate handoff alignment with the laminator 100, or other source of the credential substrates 110.

The controller 162 aligns one of the patches 122 of each of the ribbons 132 lengthwise with the substrate 110 using, for example, the methods described above, such that the leading and trailing edges 123 and 124 of the patches 122 do not overhang the leading and trailing edges 127 and 128 of the substrate 110. Once the patches 122 and the substrate 110 have been aligned with each other in the lengthwise direction, the laminating rollers 160A and 160B can be moved into a laminating position, shown in FIG. 13A. A laminating operation then commences, in which the substrate 110 and the patches 122 are fed along the processing path 112 in the direction respectively indicated by arrows 260 and 262 of FIG. 13B, while the heated laminating rollers 160A and 160B compress the patches 122 against the substrate 110 while heating the patches 122 to activate the adhesive layers 118 (FIG. 5) of the patches 122 and bond the patches 122 to the surfaces 120A and 120B of the substrate 110. In one embodiment, the laminating rollers 160A and 160B are idler rollers that rotate in response to the direction that the ribbon and substrate 110 are fed.

The carriers 131 of the ribbons 132 are peeled from the patches 122 leaving the patches 122 bonded to the substrate 110 as shown in FIG. 13B. This peeling of the carriers 131 is facilitated by angling of the carrier 131 away from the processing path 112 and, possibly, the addition of a low-adhesion coating between the carriers 131 and their patches 122. Peel-off rollers 266, shown in FIG. 13B, can be positioned downstream of the laminating rollers 160A and 160B to ensure a full release of the patches 122 from the carriers 131.

The final laminated substrate 110, can then be discharged by the pinch rollers 115 of the transport mechanism 113, shown in FIG. 3, through an output 268 where it can be, for example, collected in a hopper, or transferred to another credential production device for further processing.

Although the present invention has been described with reference to particular embodiments, workers skilled in the art will recognize that changes may be made in form and detail without departing from the spirit and scope of the invention.

What is claimed is:

1. A credential substrate laminator comprising:
   a housing including a cartridge receiver;
   a laminating roller;
   a substrate transport mechanism configured to feed substrates along a processing path in a lengthwise direction;
   a cartridge received in the cartridge receiver and including a ribbon supply that extends between the laminating roller and the processing path;
   a cartridge position adjustment mechanism configured to adjust a position of the cartridge in a widthwise direction that is transverse to the lengthwise direction relative to the substrate processing path.

2. The laminator of claim 1, wherein:
   the cartridge comprises first and second stop surfaces positioned on first and second sides of the cartridge; and
   the cartridge position adjustment mechanism comprises first and second stop cams positioned on first and second sides of the cartridge receiver that engage the first and second stop surfaces when the cartridge is received in the cartridge receiver.

3. The laminator of claim 2, wherein rotation of the first and second stop cams adjusts the widthwise position of the cartridge relative to the processing path.

4. The laminator of claim 3, wherein the adjustment mechanism further comprises an adjuster knob linked to the first and second stop cams, wherein rotation of the adjuster knob rotates the first and second stop cams.

5. The laminator of claim 4, wherein the adjuster knob is linked to the first and second cams through a linking component selected from the group consisting of a belt and a gear.

6. The laminator of claim 2, wherein the cartridge comprises a biasing component configured to bias the stop surfaces against the stop cams.

7. The laminator of claim 1, wherein the ribbon supply comprises a carrier and a plurality of overlaminate patches attached to the carrier.

8. A credential substrate laminator comprising:
a housing including a cartridge receiver;
a laminating roller;
a substrate transport mechanism configured to feed substrates along a processing path in a lengthwise direction;
a cartridge received in the cartridge receiver and including a ribbon supply that extends between the laminating roller and the processing path; and
a cartridge position adjustment mechanism comprising a pair of rotatable stop cams each having a cam surface, and a pair of stop surfaces each positioned to engage one of the cam surfaces;
wherein rotation of the stop cams moves the cam surfaces and the stop surfaces relative to the processing path and moves cartridge relative to the substrate processing path in a widthwise direction that is transverse to the lengthwise direction.

9. The laminator of claim 8, wherein:
the stop surfaces are attached to the cartridge; and
the cam stops are attached to the housing.

10. The laminator of claim 8, wherein the cam surfaces of the stop cams are tapered relative to a plane extending perpendicular to an axis of rotation of the stop cams.

11. The laminator of claim 10, wherein the stop cams and the corresponding stop surfaces are positioned on opposing sides of the cartridge.

12. The laminator of claim 8, wherein the adjustment mechanism further comprises an adjuster knob linked to the first and second stop cams, wherein rotation of the adjuster knob rotates the first and second stop cams.

13. The laminator of claim 8, wherein the adjustment mechanism comprises a linking component linking the rotatable stop cams, the linking component selected from the group consisting of a belt and a gear, wherein rotation of one of the stop cams drives the linking component, which drives the rotation of the other stop cam.

14. The laminator of claim 8, wherein the cartridge comprises a biasing component configured to bias the stop surfaces against the stop cams.

15. The laminator of claim 8, wherein:
the ribbon supply comprises a carrier and a plurality of overlaminate patches attached to the carrier; and
rotation of the stop cams moves the cam surfaces and the stop surfaces relative to the processing path and moves plurality of overlaminate patches relative to the processing path in a widthwise direction that is transverse to the lengthwise direction.

16. A method of adjusting a position of overlaminate patches of an overlaminate ribbon supported in a ribbon cartridge in a widthwise direction relative to a substrate processing path, along which credential substrates are fed in a lengthwise direction that is transverse to the widthwise direction, the method comprising:
installing the cartridge in a cartridge receiver of a credential substrate laminator, wherein first and second stop surfaces of the cartridge respectfully engage first and second cam surfaces of first and second stop cams, and the overlaminate ribbon extends between a laminating roller and the substrate processing path;
rotating the first and second stop cams; and
moving the cartridge in a widthwise direction relative to the processing path in response to the rotation of the first and second stop cams.

17. The method of claim 16, wherein:
the first and second stop cams and the first and second stop surfaces are positioned on opposing sides of the cartridge;
the method further comprises providing a linking component linking the first and second stop cams, the linking component comprising one of a belt and a gear; and
rotating the first and second stop cams comprises simultaneously rotating the first and second stop cams equal amounts using the linking component.

18. The laminator of claim 2, wherein the first and second sides of the cartridge are on opposing sides of the cartridge.

* * * * *